United States Patent
Roy et al.

(10) Patent No.: US 11,075,388 B1
(45) Date of Patent: Jul. 27, 2021

(54) FOIL-TYPE CURRENT COLLECTOR HAVING AN UNPERFORATED STRIP AT THE CONNECTOR TAB

(71) Applicant: Greatbatch Ltd., Clarence, NY (US)

(72) Inventors: Mark J. Roy, Buffalo, NY (US); Joseph M. Lehnes, Williamsville, NY (US); Marcus J. Palazzo, Wheatfield, NY (US); Robert S. Rubino, Williamsville, NY (US); William C. Thiebolt, Tonawanda, NY (US); Ho-Chul Yun, East Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 146 days.

(21) Appl. No.: 16/185,187

(22) Filed: Nov. 9, 2018

Related U.S. Application Data

(60) Provisional application No. 62/584,448, filed on Nov. 10, 2017.

(51) Int. Cl.
*H01M 4/74* (2006.01)

(52) U.S. Cl.
CPC .................. *H01M 4/742* (2013.01)

(58) Field of Classification Search
CPC ......... H01M 4/742; H01M 4/74; H01M 4/745
See application file for complete search history.

(56) References Cited

U.S. PATENT DOCUMENTS

| | | | |
|---|---|---|---|
| 4,963,161 A | 10/1990 | Chi et al. | |
| 5,227,267 A | 7/1993 | Goebel et al. | |
| 5,616,152 A | 4/1997 | Velasquez et al. | |
| 5,750,286 A | 5/1998 | Paulot et al. | |
| 5,756,232 A | 5/1998 | Kelly et al. | |
| 6,110,622 A | 8/2000 | Frysz et al. | |
| 6,790,561 B2* | 9/2004 | Gan ................. | H01M 4/04 29/623.5 |
| 6,893,777 B2 | 5/2005 | Probst et al. | |
| 7,000,297 B2 | 2/2006 | Frustaci et al. | |
| 7,722,992 B1 | 5/2010 | Zayatz | |
| 7,882,622 B2 | 2/2011 | Polsonetti et al. | |
| 8,232,005 B2* | 7/2012 | Gerber ............... | H01G 11/30 361/502 |
| 10,418,638 B2* | 9/2019 | Woo .................. | H01M 4/667 |
| 2011/0104542 A1 | 5/2011 | Gan | |
| 2015/0180040 A1* | 6/2015 | Sano .................. | H01M 10/06 429/241 |

FOREIGN PATENT DOCUMENTS

| | | | |
|---|---|---|---|
| CN | 104852055 | * | 8/2015 |
| CN | 104852055 A | * | 8/2015 |

* cited by examiner

*Primary Examiner* — Ula C Ruddock
*Assistant Examiner* — Thomas H. Parsons
(74) *Attorney, Agent, or Firm* — Michael F. Scalise

(57) ABSTRACT

A current collector for an electrochemical cell is described. Unlike conventional current collector designs, the current collector does not have an unperforated perimeter frame completely bordering or surrounding a perforated interior region. Instead, only that portion of the current collector adjacent to the connector tab is unperforated. Otherwise, perforations extend directly to the perimeter edge.

18 Claims, 3 Drawing Sheets

FOIL-TYPE CURRENT COLLECTOR HAVING AN UNPERFORATED STRIP AT THE CONNECTOR TAB

CROSS-REFERENCE TO RELATED APPLICATION

This application claims priority from U.S. Provisional Patent Application Ser. No. 62/584,448, filed Nov. 10, 2017.

BACKGROUND OF THE INVENTION

1. Field of the Invention

The present invention relates to the conversion of chemical energy to electrical energy. More particularly, the present invention relates to a current collector that is useful in electrical energy storage devices such as electrochemical cells of both primary and secondary chemistries. More particularly, the present invention is directed to a current collector having a perforated hole pattern that extends to the opposed right and left outer edges and the bottom outer edge thereof, but not to the upper outer edge. The upper edge is unperforated, and it is this upper outer edge from which a connector tab extends.

2. Prior Art

An exemplary current collector 10 according to the prior art is shown in FIG. 1. The current collector 10 comprises a connector tab 12 joined to a solid frame 14. The frame 14 extends inwardly a relatively short distance from a perimeter or outer edge to a perforated interior region 16. More particularly, the prior art current collector 10 comprises first and second major faces (only face 18 is shown) extending to the surrounding perimeter edge. The perimeter edge is formed by opposed right and left outer edges 20 and 22 extending to and meeting with upper and lower outer edges 24 and 26. In this prior art current collector, the right and left edges 20, 22 and the upper edge 24 are generally planar or straight while the lower edge 26 is curved, however, that is by way of example and not indicative of all conventional current collectors. Moreover, even though the perforations in the interior region 16 are shown having the shape of diamonds, that is also by way of example as virtually any opening shape is practical. The important point is that the prior art current collector 10 has an unperforated frame 14 completely bordering or surrounding the perforated interior region 16 including where the frame supports the connector tab 12.

While the exemplary prior art current collector 10 is satisfactory for it intended purpose, there is a need for a new current collector design that not only enables the electrode active material contacted to the opposed major faces to lock together through the perforations, but that exhibits good structural integrity at the current collector tab. This structural integrity must last through the useful life of the electrochemical cell.

In that respect and in contrast to the prior art current collector 10, the current collector of the present invention does not have an unperforated perimeter frame completely bordering or surrounding a perforated interior region. Instead, only that portion of the current collector adjacent to the connector tab is unperforated. Otherwise, perforations extend fully to the perimeter outer edge. Providing an unperforated section adjacent to the connector tab helps with structural integrity when the current collector is connected to a terminal pin. Moreover, providing perforations in the remainder of the current collector body helps maintain contact of the electrode active material to the opposed major current collector surfaces or faces through the life of the electrochemical cell. Perforations help the electrode active material on one of the major current collector faces to lock to the electrode active material on the other major face. The electrode active material locks to itself through the perforations, and the relatively short width of the unperforated perimeter or outer edge adjacent to the connector tab is not detrimental to this locking relationship.

SUMMARY OF THE INVENTION

Accordingly, the present invention is directed to a novel current collector design. The current collector comprises a substrate having a unique pattern of openings or perforations that facilitate improved discharge without compromising mechanical integrity. Except at the upper outer edge adjacent to the current collector tab, the openings extend to the perimeter of the current collector. At the upper outer edge there is a strip of unperforated material supporting the connector tab. In one embodiment, the unperforated strip extends to the opposed right and left outer edges of the current collector. In another embodiment, the unperforated strip is localized at the connector tab and does not extend to the right and left current collector edges.

These and other aspects of the present invention will become increasingly more apparent to those skilled in the art by reference to the following detailed description and the appended drawings.

DETAILED DESCRIPTION OF THE PREFERRED EMBODIMENTS

Two commonly used electrochemical cell designs have the opposed polarity electrodes in a spirally-wound design or assembled in a multiple plate or multi-plate configuration. In either case, the positive and negative electrodes are comprised of a current collector having electrode active material contacted thereto. The current collector can either be the casing which houses the electrochemical cell or a conductive substrate, such as a foil or screen. The present invention is directed to the latter type of current collector and the perforated foil is particularly useful in a cathode having a SVO/CF$_x$ sandwich design, for example, a sandwich cathode as described in U.S. Pat. No. 6,551,747 to Gan, which is assigned to the assignee of the present invention and incorporated herein by reference.

Figure 1:
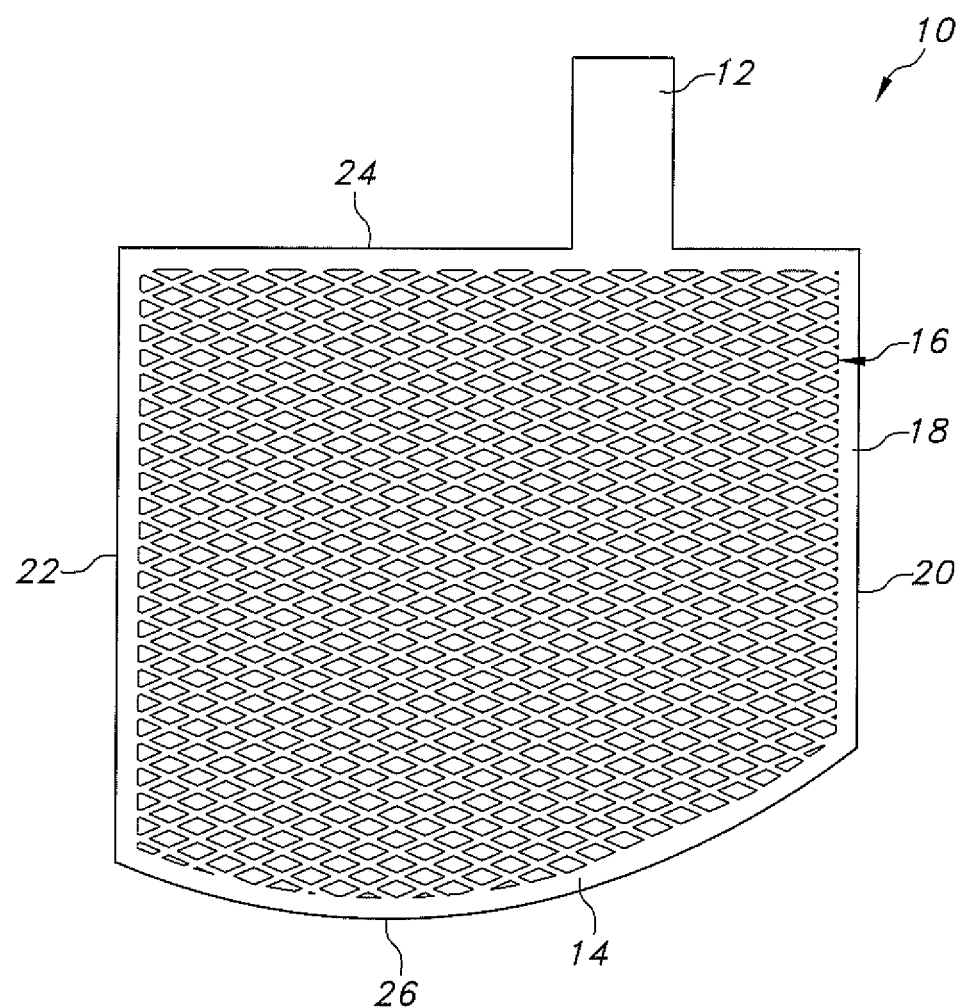
FIG. 1 is a side-elevational view of a prior art current collector 10 having an unperforated frame 14 completely bordering or surrounding an interior perforated region 16.
Figure 2:
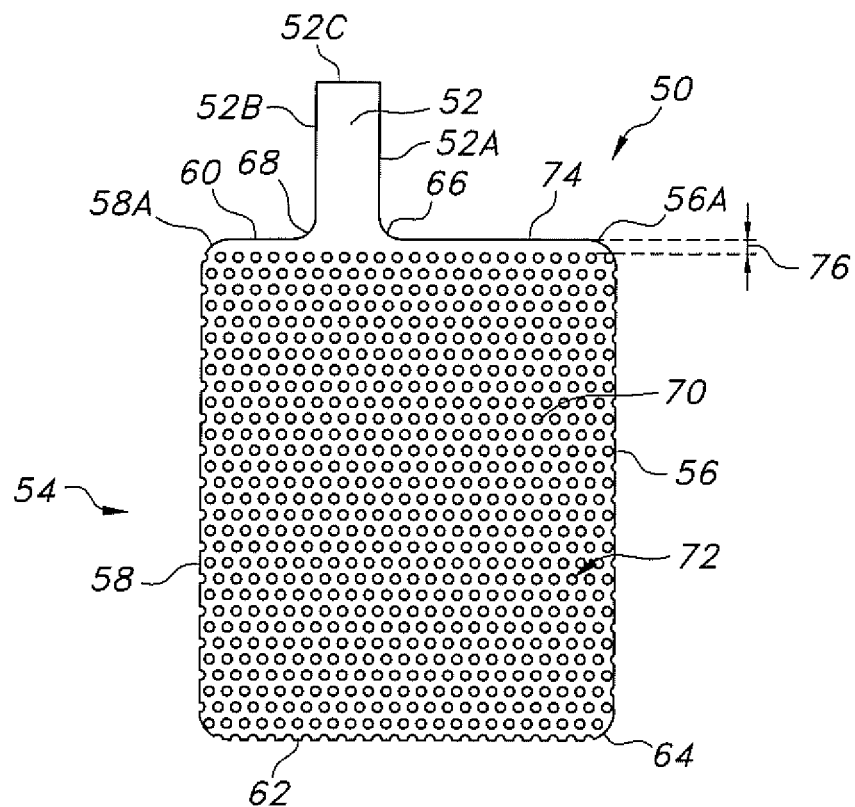
FIG. 2 is a side-elevational view of one embodiment of a current collector 50 according to the present invention.

Referring now to the drawings, FIG. 2 illustrates one embodiment of a current collector 50 according to the present invention. The current collector 50 is of a sheet or foil of electrically conductive metallic material. Suitable electrically conductive materials include aluminum, nickel, copper, stainless steel, tantalum, cobalt and titanium, and alloys thereof, and have a thickness of between 0.0005" to 0.002". For a SVO/$CF_x$ sandwich design, the foil is preferably composed of aluminum (all grades having an Al content higher than 95%). For the present invention, a "foil" is defined as a metal material in the form of a very thin sheet.

The current collector 50 has at least one connector tab 52 as a generally solid planar structure extending outwardly from a main body portion 54. The main body portion is defined by a right outer edge 56 opposite a left outer edge 58, and an upper outer edge 60 opposite a lower outer edge 62. Adjacent outer edges meet each other at rounded or radiused corners. For example, the right edge 56 meets the lower edge 62 at a radiused corner 64.

The connector tab 52 extends upwardly from the upper edge 60 and is composed of a right tab edge 52A opposite a left tab edge 52B. The right and left tab edges 52A, 52B extend to and meet with an upper tab edge 52C. As shown, the right and left tab edges 52A, 52B are substantially parallel to each other. The right tab edge 52A meets the upper tab edge 60 at a radiused inside right corner 66. Similarly, the left tab edge 52B meets the upper tab edge at a radiused inside left corner 68.

FIG. 2 shows the connector tab 52 being spaced closer to the left edge 58 than the right edge 56 of the main body portion 54. However, that is a function of the exemplary illustration of the current collector 50 shown in the drawing. In another exemplary embodiment (not shown), the connector tab 52 is spaced closer to the right edge 56 than the left edge 58. In still another exemplary embodiment, the connector tab 52 is centered between the right and left edges 56, 58. Moreover, while FIG. 2 shows one connector tab 52 extending outwardly from the unperforated strip, those skilled in the art will readily understand that there can be two, three, or more tabs 52 spaced at regular or irregular intervals across the length of the upper edge 60.

According to the present invention, the current collector 50 is provided with a plurality of perforations or openings 70 that extend completely through the thickness from a front-major surface 72 to an opposed back-major surface (not shown) thereof. The perforations 70 also extend to the right, left and lower outer edges 56, 58 and 62, but not to the upper outer edge 60. That way, the plurality of openings at the right, left and lower outer edges 56, 58 and 62 provide those portions of the peripheral edge with an irregular shape comprising portions of openings.

Specifically, the current collector foil has a circular pattern of openings 70 that consists of holes or openings (perforations), each having a diameter that ranges from about 0.010" to about 0.040", preferably a diameter of about 0.020". The strands connected to immediately adjacent openings have a width that ranges from about 0.030" to about 0.050", preferably about 0.040". The term "width" is measure as the distance from a tangent of one opening to the tangent of an immediately adjacent opening. The resulting open area (OA) in the current collector body is about 10% to about 70%, more preferably about 20% to about 50% of the perforated portion of the main body portion 54.

An unperforated strip 74 of current collector foil material extends from the upper edge 60 part-way toward the lower edge 62. As shown in FIG. 2, the unperforated strip 74 has a height 76 measure from the upper edge 60 to an imaginary line that is tangent to the openings 70 in the row immediately adjacent to the upper edge that ranges from about 0.010" to about 0.20". The connector tab 52 extends upwardly from the upper edge 60 as an unperforated extension of the unperforated strip 74. As illustrated in FIG. 2, the unperforated strip 74 has a lateral dimension that extends to and meets with the right and left edges 56, 58 at the respective areas of the edges labeled 56A and 58A.

Figure 2A:
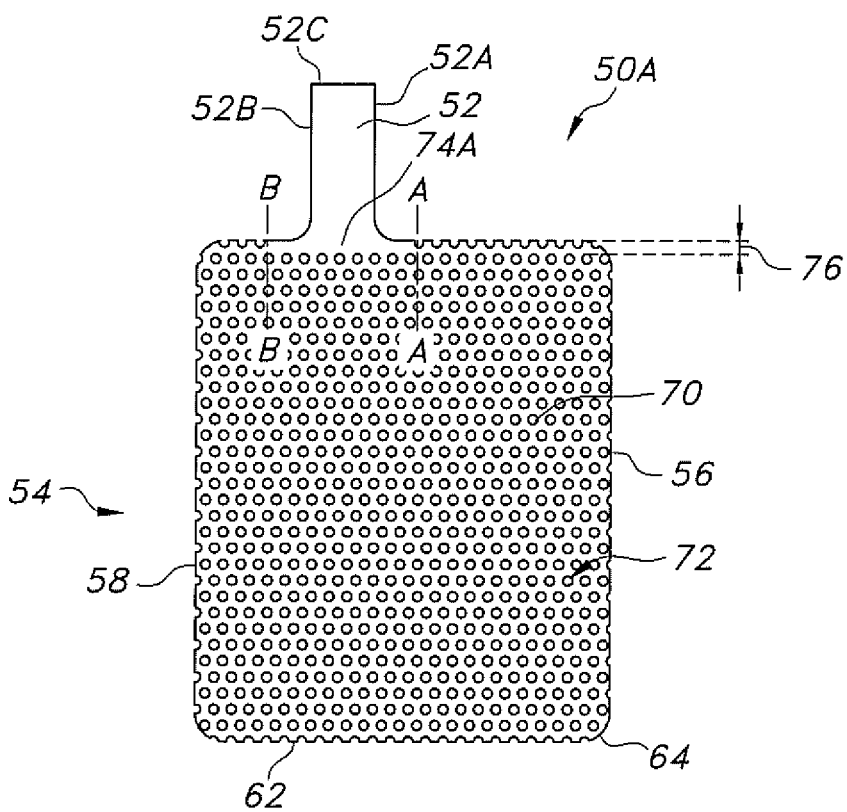
FIG. 2A is a side-elevational view of another embodiment of a current collector 50A according to the present invention.

FIG. 2A shows an alternate embodiment of the present current collector 50A where the unperforated strip 74A does not laterally extend to the right and left edges 56, 58. As illustrated, the areas extending from the right and left dashed lines A-A and B-B to the upper edge 60 and to the respective right and left edges 56 and 58 that are unperforated in the embodiment illustrated in FIG. 2 are instead perforated in this embodiment. What is important according to the present invention is that the connector tab 52 connects to an unperforated strip of current collector material that is localized to the vicinity of the tab connected to the current collector body 54. Moreover, while unperforated strip 74A does not laterally extend to the right and left edges 56, 58, as with the embodiment shown in FIG. 2, the unperforated strip 74 has a height 76 measure from the upper edge 60 to an imaginary line that is tangent to the openings 70 in the row immediately adjacent to the upper edge that ranges from about 0.010" to about 0.20".

The term localized means that with the connector tab 52 having a width of "x" measured from the right tab edge 52A to the left tab edge 52B, the unperforated area extends laterally for a length of about x to 5x the tab width, preferably from about 2x to 3x the tab width, from an imaginary line coincident the right tab edge 52A toward the right current collector edge 56 and from an imaginary line coincident the left tab edge 52B toward the left current collector edge 58. The unperforated strip 74, 74A, whether extending laterally all the way to the right and left edges 56, 58 as shown in FIG. 2, or only part-way to those edges as shown in FIG. 2A, helps improve the structural integrity of the respective current collector 50, 50A as an electrochemical cell in which it is incorporated is discharged.

Another important aspect of the present invention is that, as previously described, the current collectors 50, 50A have perforations or openings 70 extending fully or directly to the right, left and bottom outer edges 56, 58 and 62. This is an improvement over conventional designs in that active material contacted to the front and back major surfaces locks to itself through the perforations, even at the current collector outer edge where the plurality of openings have an irregular shape comprising portions of openings. This helps prevent the active material from sloughing or delaminating from the current collector, particularly at the outer edges.

In that respect, the present current collectors 50, 50A are particularly useful in a cathode of either a primary or secondary cell chemistry. During cell discharge, electrons from the anode travel through a load and are distributed to the cathode to react with anode ions that have traveled directly through the separator to a reaction site on the cathode active material. It is important that these reactions occur uniformly throughout the cathode, especially when the cathode active material has a higher resistivity than the current collector, such as silver vanadium oxide in a primary lithium cell, for example a lithium/silver vanadium oxide (Li/SVO) cell, or in a lithium/(SVO/$CF_x$) sandwich cathode cell, and in a secondary cell, for example one having a carbonaceous anode and a lithium cobalt oxide or lithium nickel cobalt oxide cathode. Although current flow across the current collector is important, current flow across the cathode active material itself is critical because it has a greater impact on the even and uniform discharge of the anode and cathode electrodes. In other words, the transport of electrons to the cathode active material through the cathode current collector must be uniform for a cell to discharge at a constant rate, especially as end-of-life (EOL) discharge approaches. This is particularly the case when the current collector is provided with perforations or openings.

Thus, it is believed that having the perforations or openings 70 extending fully or directly to the right, left and bottom edges 56, 58 and 62 of the current collector 50, 50A helps ensure that the active materials supported on the opposed major faces of the current collector lock together through the perforations. Regardless whether the same cathode active material is contacted to the opposed major surfaces, such as a SVO cathode, or different cathode active material are contacted to the opposed major current collector surfaces, such as a $CF_x$/SVO sandwich cathode, this locking mechanism helps to prevent sloughing or delamination of the active material from the current collector surface, which benefits uniform discharge throughout the life of the cell, even at the outer edges of the current collector.

Figure 3:
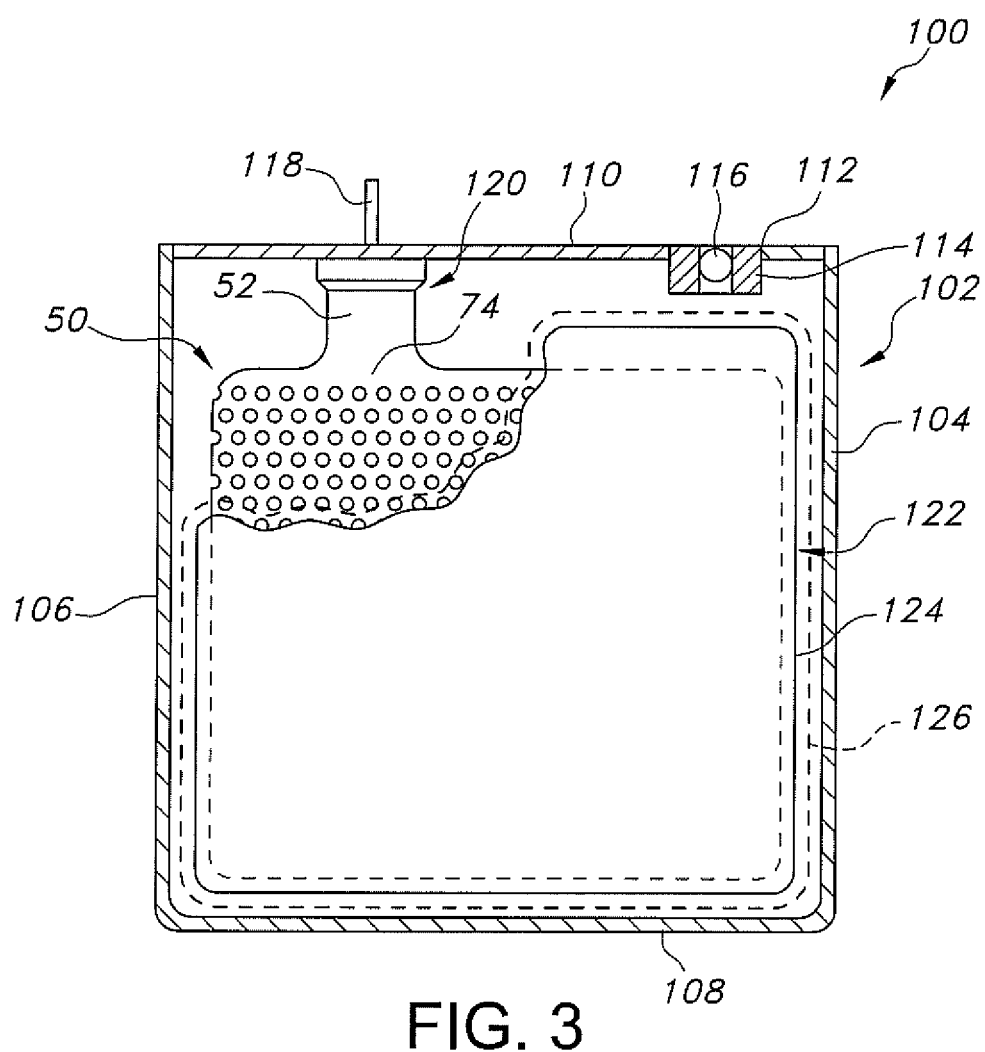
FIG. 3 is a side-elevational view, partly broken away, of an exemplary electrochemical cell 100 incorporating the present invention current collector 50 shown in FIG. 2.

FIG. 3 shows an exemplary electrochemical cell 100 that is useful with either one of the current collectors 50, 50A. For sake of clarity, current collector 50 is shown. The cell 100 includes a casing 102 comprising an open-ended container formed from spaced apart front and back sidewalls (not shown) joined by right and left sidewalls 104 and 106, the front, back, right and left sidewalls all meeting a bottom wall 108. Preferably the junctions between the various sidewalls and bottom wall are curved. A lid 110 is secured, such as by welding, to the open end of the container to close the casing 102.

Lid 110 has an opening 112 that serves as a port for filling an electrolyte (not shown) into the casing after the cell's internal components have been assembled therein and lid 110 has been sealed to the container sidewalls. In the final and fully assembled condition, a fill ferrule 114 is welded to the lid 110 in the opening 112 and a plug, such as a ball 116, is hermetically sealed in the ferrule opening to close the cell in a gas tight manner. Alternately, the plug 116 is welded into an opening in the lid 110 without the benefit of the fill ferrule 114. The casing 102, lid 110, fill ferrule 114 and sealing ball 116 are preferably of a conductive material. Suitable materials include nickel, aluminum, stainless steel, mild steel, nickel-plated mild steel and titanium. Preferably, the casing, lid, fill ferrule and sealing ball are of the same material.

A terminal lead 118 for one of the anode and the cathode is electrically insulated from the lid 110 and the casing 102 by a glass-to-metal seal 120. In a case-negative cell configuration, the lead 118 serves as the cathode terminal and the lid 110 and casing 102 serve as the negative or anode terminal, as is well known to those skilled in the art. A case-positive cell configuration has the positive electrode or cathode contacted to the casing 102 with the anode supported on the current collector 50, 50A connected to the lead 118.

In either case, the exemplary cell 100 shown in FIG. 3 includes a central electrode 122 comprising the current collector 50, 50A of the present invention supporting at least one of the opposite polarity active materials 124. In a case-negative cell configuration, current collectors 50, 50A support opposed layers of cathode active material 124 contacting the opposite major sides thereof locked together through their many perforations or openings. The tab 52 is then connected to the terminal lead 118 such as by welding. In a case-positive cell configuration, anode active material is supported on the opposite major sides of the current collector and locks to itself through the perforations.

The central electrode 122 of cell 100 is sealed in a separator envelope 126 to prevent direct contact with the opposite polarity electrode. While not shown in FIG. 3, in a case-negative design the opposite polarity electrode is the anode comprised of anode active material contacted to the inner major sides of the current collectors 50, 50A shown in respective FIGS. 2 and 2A.

The cell 100 can be of either a primary or a secondary chemistry. A preferred primary electrochemical cell is of an alkali metal anode, such as of lithium, and a solid cathode active material. Exemplary cathode active materials include silver vanadium oxide (SVO), copper silver vanadium oxide, manganese dioxide, and fluorinated carbon ($CF_x$). An exemplary secondary cell has a carbonaceous anode and a lithiated cathode active material such as lithium cobalt oxide. In either type of cell chemistry, the activating electrolyte is of a nonaqueous chemistry.

By way of example, in an illustrative primary cell, the active material of the cathode body is a silver vanadium oxide cathode material as described in U.S. Pat. Nos. 4,310,609 and 4,391,729, both to Liang et al., or a sandwich cathode design as described in U.S. Pat. No. 6,551,747 to Gan, all assigned to the assignee of the present invention, the disclosures of which are hereby incorporated by reference. The cathode current collectors 50, 50 can be aluminum, nickel, copper, stainless steel, tantalum, cobalt and titanium, and alloys thereof, the cathode terminal lead can be molybdenum, and the separator 126 can be of polypropylene. The activating electrolyte can be a 1.0M to 1.4M solution of $LiAsF_6$ or $LiPF_6$ in a 50:50 mixture of, by volume, 1,2-dimethoxyethene and propylene carbonate. The glass-to-metal seal can be of TA-23 Hermetic sealing glass, while the casing 102 can be of titanium or stainless steel.

Those skilled in the art will readily recognize that the current collectors 50, 50A of the present invention are also readily adapted to primary electrochemical systems of a liquid catholyte type, such as a lithium/thionyl chloride cell, or secondary cells such as a lithium ion cell having a carbonaceous negative electrode and lithium cobalt oxide positive electrode.

In the secondary electrochemical cell, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glass carbon, etc.), which are capable of reversibly retaining the lithium species, is preferred for the anode material. Regardless the form of the carbon, fibers of the carbonaceous material are particularly advantageous because they have excellent mechanical properties that permit them to be fabricated into rigid electrodes capable of withstanding degradation during repeated charge/discharge cycling. Moreover, the high surface area of carbon fibers allows for rapid charge/discharge rates.

Also, in secondary systems, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and lithium cobalt nickel oxide ($LiCo_{1-x}Ni_xO_2$).

An electrolyte is also required to activate the anode/cathode combination in the secondary system. The composition of the electrolyte depends on the materials of construction of the anode and the cathode as well as the product application for the cell. A preferred electrolyte for a lithium ion secondary cell has a lithium salt dissolved in a solvent system of dimethyl carbonate, diethyl carbonate, ethyl methyl carbonate and propylene carbonate.

The current collectors 50, 50A of the present invention can also be employed in a cell having a case-positive electrical configuration. Replacing lithium anode elements with cathode plates provides a case-positive electrical configuration. Accordingly, cathode plates would be replaced by lithium anode plates, sandwiched together and against the current collectors 50, 50A of the present invention serving as an anode current collector that, in turn, is connected to the terminal lead 118 and insulated from the casing by the glass-to-metal seal 120. In all other respects, the anode current collector in the case-positive configuration is similar to that previously described with respect to cell 100 having the case-negative configuration.

The present invention may also be used with acid or alkaline-based batteries.

It is appreciated that various modifications to the present inventive concepts described herein may be apparent to those of ordinary skill in the art without departing from the scope of the present invention as defined by the herein appended claims.

What is claimed is:

1. A current collector for an electrochemical cell, the current collector comprising:
   a) an electrically conductive body having a plurality of openings providing a perforated portion surrounded by a peripheral edge, the peripheral edge comprising at least a right peripheral edge portion opposite a left peripheral edge portion, the right and left peripheral edge portions meeting an upper peripheral edge portion, wherein the upper peripheral edge portion has an unperforated strip that extends to spaced apart unperforated strip right and left ends that extend laterally part-way to the respective right and left peripheral edge portions with the plurality of openings extending to the remainder of the upper peripheral edge portion that in not the unperforated strip and to the remainder of the peripheral edge comprising at least the right and left peripheral edge portions; and
   b) a connector tab extending outwardly from the unperforated strip of the peripheral edge of the electrically conductive body, wherein the connector tab has a width of "x" measured from a connector tab right edge to a connector tab left edge, and with respect to right and left imaginary lines that are coincident the respective connector tab right and left edges, the unperforated strip of the peripheral edge extends laterally toward the respective right and left peripheral edge portions of the electrically conductive body for a distance ranging from about x to 5x from each of the right and left imaginary lines.

2. The current collector of claim 1, wherein the plurality of openings extending to the remainder of the upper peripheral edge portion that in not the unperforated strip and to the remainder of the peripheral edge comprising at least the right and left peripheral edge portions comprise peripheral ones of the plurality of openings so that except for the unperforated strip, the peripheral edge has an irregular shape comprising portions of the openings.

3. The current collector of claim 1, wherein the unperforated strip extends into an interior of the electrically conductive body, the unperforated strip having a height ranging from about 0.010" to about 0.20".

4. The current collector of claim 1, wherein the plurality of openings each have a diameter that ranges from about 0.010" to about 0.040".

5. The current collector of claim 1, wherein the plurality of openings provides a perforated open area that ranges from about 10% to about 70% of the perforated portion of the electrically conductive body.

6. The current collector of claim 1, wherein a strand connected to immediately adjacent openings has a width that ranges from about 0.030" to about 0.050".

7. The current collector of claim 1, wherein at least part of the peripheral edge is curved.

8. The current collector of claim 1, being configured for incorporation into an electrochemical cell of either a primary or a secondary chemistry.

9. The current collector of claim 1, being of a material selected from the group of aluminum, nickel, copper, stainless steel, tantalum, cobalt and titanium, and alloys thereof.

10. A current collector for an electrochemical cell, the current collector comprising:
    a) a first major face opposite a second major face with a perforated portion having a plurality of openings extending to the current collector first and second major faces;
    b) a peripheral edge meeting the current collector first and second major faces, wherein the peripheral edge comprises a right peripheral edge portion opposite a left peripheral edge portion, the right and left peripheral edge portions meeting a lower peripheral edge portion opposite an upper peripheral edge portion, and wherein the upper peripheral edge portion has an unperforated strip that extends to spaced apart unperforated strip right and left ends that are spaced laterally inwardly from the respective right and left peripheral edge portions with the plurality of openings extending to a remainder of the peripheral edge that is not the unperforated strip; and
    c) a connector tab extending outwardly from the unperforated strip of the peripheral edge, wherein the connector tab has a width of "x" measured from a connector tab right edge to a connector tab left edge, and with respect to right and left imaginary lines that are coincident the respective connector tab right and left peripheral edge portions of the electrically conductive body, the unperforated strip of the peripheral edge extends laterally toward the respective right and left edges for a distance ranging from about x to 5x from each of the right and left imaginary lines.

11. The current collector of claim 10, wherein the plurality of openings extending to the remainder of the upper peripheral edge portion that in not the unperforated strip and to the right, lower and left peripheral edge portions comprise peripheral ones of the plurality of openings so that except for the unperforated strip, the peripheral edge has an irregular shape comprising portions of the openings.

12. The current collector of claim 10, wherein the unperforated strip extends into an interior of the electrically conductive body, the unperforated strip having a height ranging from about 0.010" to about 0.20".

13. The current collector of claim 10, wherein the plurality of openings each have a diameter that ranges from about 0.010" to about 0.040".

14. The current collector of claim 10, wherein the plurality of openings provides a perforated open area that ranges from about 10% to about 70% of the perforated portion of the electrically conductive body.

15. The current collector of claim 10, wherein a strand connected to immediately adjacent openings has a width that ranges from about 0.030" to about 0.050".

16. A cathode for an electrochemical cell, the cathode comprising:
a) current collector comprising:
i) an electrically conductive body having a plurality of openings providing a perforated portion surrounded by a peripheral edge, the peripheral edge comprising at least a right peripheral edge portion opposite a left peripheral edge portion, the right and left peripheral edge portions meeting an upper peripheral edge portion, wherein the upper peripheral edge portion has an unperforated strip that extends laterally to spaced apart unperforated strip right and left ends with the plurality of openings extending to the remainder of the upper peripheral edge portion that is not the unperforated strip and to the right and left peripheral edge portions; and
ii) a connector tab extending outwardly from the unperforated strip, wherein the connector tab has connector tab right and left edges that are spaced laterally inwardly from the respective unperforated strip right and left ends, and wherein the unperforated strip right and left ends are spaced laterally inwardly from the respective right and left peripheral edge portions of the electrically conductive body; and
b) a first cathode active material contacted to a first major surface of the electrically conductive body; and
c) a second cathode active material contacted to an opposite, second major surface of the electrically conductive body,
d) wherein the first cathode active material is selected from the group of silver vanadium oxide (SVO), copper silver vanadium oxide, and manganese dioxide, and wherein the second cathode active material is fluorinated carbon ($CF_x$).

17. The cathode of claim 16, wherein the first cathode active material is SVO and the second cathode active material is $CF_x$.

18. The cathode of claim 16, wherein the plurality of openings provides a perforated open area that ranges from about 10% to about 70% of the perforated portion of the electrically conductive body.

* * * * *